United States Patent [19]
Felton

[11] Patent Number: 6,006,782
[45] Date of Patent: Dec. 28, 1999

[54] SNUBBER VALVE

[75] Inventor: George Nicholas Felton, Gillingham, United Kingdom

[73] Assignee: Lucas Industries, United Kingdom

[21] Appl. No.: 09/103,011

[22] Filed: Jun. 23, 1998

[30] Foreign Application Priority Data

Oct. 7, 1997 [GB] United Kingdom .................... 9714466

[51] Int. Cl.$^6$ ................................................. F16K 15/00
[52] U.S. Cl. .................................. 137/513.3; 137/543.23; 137/538
[58] Field of Search ........................... 137/513.3, 543.23, 137/535, 538

[56] References Cited

U.S. PATENT DOCUMENTS

| | | | |
|---|---|---|---|
| 3,135,209 | 6/1964 | Fujisawa ..................................... | 103/41 |
| 3,170,481 | 2/1965 | Presnell ................................. | 137/513.3 |
| 4,009,592 | 3/1977 | Boerger ................................. | 137/513.3 |
| 4,080,988 | 3/1978 | Robertson ............................. | 137/513.3 |
| 4,561,460 | 12/1985 | Smith ................................... | 137/513.3 |
| 4,840,544 | 6/1989 | Kuromitsu et al. ................... | 137/513.3 |
| 5,241,986 | 9/1993 | Yie ....................................... | 137/543.23 |
| 5,295,534 | 3/1994 | Porter ................................... | 137/513.3 |
| 5,390,692 | 2/1995 | Jones et al. ........................... | 137/513.3 |
| 5,529,096 | 6/1996 | Rowe, Jr. et al. .................... | 137/513.3 |
| 5,715,795 | 2/1998 | Guentert et al. ........................ | 123/467 |

FOREIGN PATENT DOCUMENTS

| | | |
|---|---|---|
| 4037465A1 | 7/1992 | Germany . |
| 195 35 368A1 | 9/1995 | Germany . |
| 431140 | 6/1935 | United Kingdom . |

*Primary Examiner*—Denise L. Ferensic
*Assistant Examiner*—Joanne Y. Kim
*Attorney, Agent, or Firm*—Michael Best & Friedrich LLP

[57] ABSTRACT

A snubber valve is described which comprises a valve member slidable within a bore provided in a valve body. The valve member includes a region arranged to engage a seating, a spring biasing the valve member towards the seating. The spring engages a spring abutment region of the valve member. The valve member is provided with a passage which provides a flow path between a second end of the valve member and a part of the valve member between the first region and the spring abutment region.

5 Claims, 1 Drawing Sheet

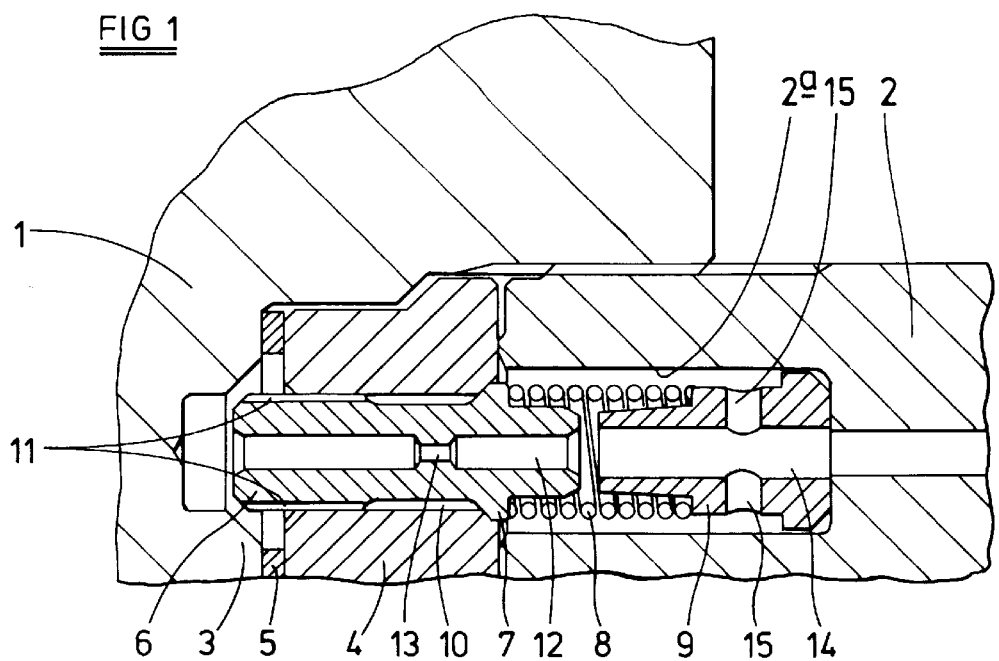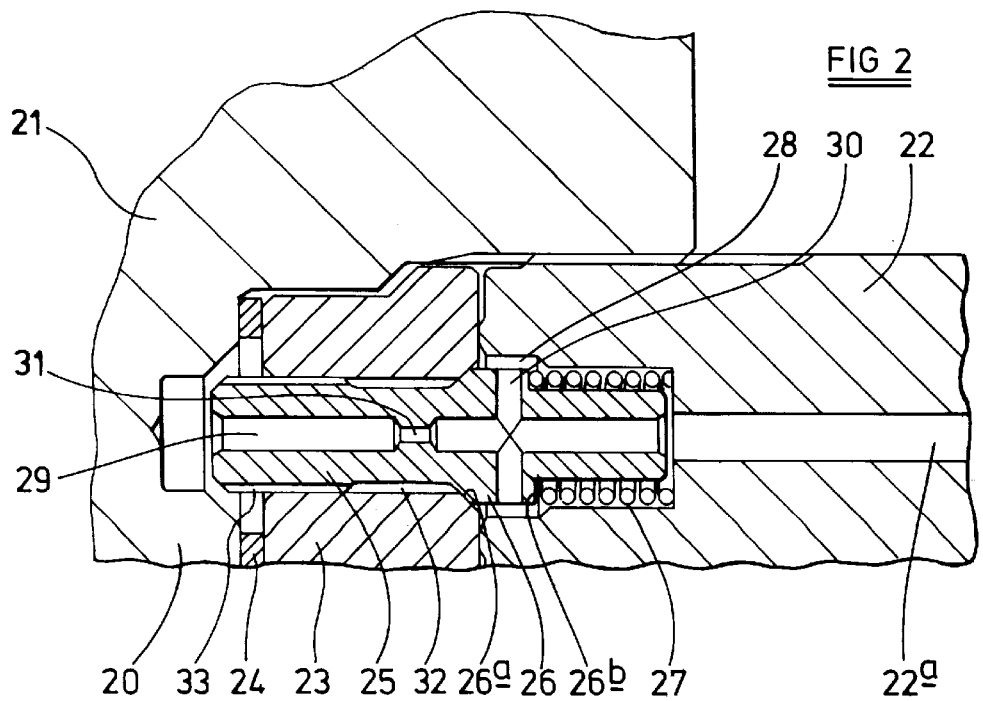

SNUBBER VALVE

This invention relates to a snubber valve for use in the fuel system of a compression ignition internal combustion engine.

Snubber valves are commonly located in the outlets of a fuel pump and are intended to allow a substantially unimpeded flow of fuel from the pump towards an associated injector during fuel delivery, and to permit controlled depressurization of the fuel line between the snubber valve and the injector in order to reduce the disadvantageous effects of cavitation.

FIG. 1 illustrates a known snubber valve arrangement located in an outlet of a pump 1, and secured in position by the connection of the end of a high pressure fuel line connector 2 to the pump 1. The pump outlet comprises a bore 3, part of which is screw threaded, the bore 3 communicating through a passage (not shown) with a pumping chamber. Within the bore 3 is located a snubber valve body 4, the body 4 being trapped between the body of the pump 1 and the end of the line connector 2 which is in screw threaded engagement with the threaded part of the bore 3. A sealing washer 5 is located between the body of the pump 1 and the valve body 4.

The valve body 4 includes a bore within which a valve member 6 is slidable, the valve member 6 including a region 7 of enlarged diameter for engagement with a seating defined around an end of the bore. The valve member 6 is biased into engagement with the seating by a spring 8 engaged between the valve member 6 and a stop 9 located in an enlarged diameter part 2a of the bore of the connector 2.

The valve member 6 is provided with an annular groove which defines, with the pump body, a chamber 10 which communicates with the bore 3 through grooves or flutes 11 provided on the valve member 6. The valve member 6 also includes an axially extending passage 12 including a region 13 of reduced diameter acting to restrict flow through the passage 12. The stop 9 includes an axially extending passage 14 which communicates with a plurality of radially extending passages 15.

In the position shown, the bore 3 and high pressure fuel line connector 2 are at low pressure, and the valve member 6 is biased into engagement with its seating by the spring 8. When injection is to commence, the fuel pressure within the bore 3 rises, applying a force to the valve element 6 acting against the action of the spring 8, the force being of sufficient magnitude to lift the valve member 6 from its seating. Fuel is then able to flow from the bore 3 through the flutes 11 and chamber 10 past the seating to the part 2a of the high pressure fuel line connector 2. The fuel flows over and around the spring 8, and through the passages 15, 14 towards the injector. A small quantity of fuel also flows through the passage 12, but the quantity of fuel flowing in this manner is restricted by the presence of the region 13.

When injection is to be terminated, the fuel pressure in the bore 3 is reduced rapidly. The reduced pressure within the bore 3 is insufficient to maintain the valve member 6 in its lifted position, and the fuel pressure within the connector 2 together with the spring 8 act to return the valve member 6 into engagement with its seating. As fuel can no longer flow past the seating, and as there is a pressure imbalance across the valve member 6, fuel flows from the high pressure fuel line connector 2, through the passage 12 at a restricted rate governed by the dimensions of the region 13. The rate of fuel flow is constrained at a sufficiently low level to reduce the risk of cavities being drawn within the connector 2 and associated high pressure fuel pipe and injector.

The arrangement illustrated in FIG. 1 has several disadvantages. The part 2a of the line 2 is of relatively large volume which requires pressurization each time injection is to occur, resulting in the fuel system being relatively inefficient. Further the flow of fuel over and around the spring 8 may result in damage to the spring as a result of cavitation erosion. It is an object of the invention to provide a snubber valve in which the effect of these disadvantages is reduced.

According to the present invention there is provided a snubber valve comprising a valve member slidable within a bore provided in a valve body and having first and second ends, the bore defining a seating with which a first region of the valve member is engageable, the valve member being biased into engagement with the seating by a spring which engages a spring abutment region of the valve member, the valve member and bore defining a flow path between the seating and the first end of the valve member, the valve member including passage means extending from the second end thereof to a part of the exterior of the valve member located between the first region and the spring abutment region, and restricted by-pass passage means providing a restricted flow path between the first and second ends of the valve member.

The presence of the passage between the second end of the valve member and part of the valve member between the first region and spring abutment region thereof reduces the flow of fuel over and around the spring, in use, thus reducing the risk of damage to the spring due to cavitation erosion.

The restricted by-pass passage means may be defined, in part, by part of the flow path between the seating and the first end of the valve member.

Since there is no need to provide a flow space around the spring, the high pressure volume is reduced and the efficiency of the fuel system is increased.

The invention will further be described, by way of example, with reference to the accompanying drawings, in which:

FIG. 1 is a sectional view illustrating a known snubber valve; and

FIG. 2 is a sectional view illustrating a snubber valve in accordance with an embodiment of the invention.

FIG. 2 illustrates a snubber valve located within an outlet bore 20 provided in the body 21 of a pump. The bore 20 communicates through a passage (not shown) with a pumping chamber of the pump, and also with means for rapidly reducing the fuel pressure in order to terminate injection. Part of the bore 20 is provided with screw threads which cooperate with complimentary screw-threads provided on the exterior surface of an end of a high pressure fuel line connector 22 which communicates with a high pressure pipe and a fuel injector. Located within the outlet bore 20 is a valve body 23, a sealing washer 24 being trapped between the valve body 23 and a wall defining the bore 20, the valve body 23 being engaged by an end of the high pressure fuel line connector 22 resulting in the valve body 23 being rigidly secured in position within the outlet bore 20.

The valve body 23 includes an axially extending through bore within which a valve member 25 is slidable. The valve member 25 includes a region 26 of enlarged diameter which includes a surface 26a defining a first region which, in use, is engageable with a seating defined around an end part of the bore provided in the valve body 23. The enlarged diameter region 26 also includes a surface 26b defining a spring abutment region against which a spring 27 engages to bias the valve member 25 into engagement with its seating. As illustrated in FIG. 2, the spring 27 is trapped between the surface 26b and an end wall of a chamber 28 located within an end of the high pressure fuel line connector 22.

The valve member 25 is provided with an axially extending passage 29 which communicates with radially extending passages 30, the passages 30 communicating with the exterior of the valve member 25 at positions located between the surface 26a and the spring abutment surface 26b. The passage 29 includes a restricted region 31 located between the point at which the passages 30 communicate with the passage 29 and a first end of the valve member 25. It will be appreciated that the passage 29 and the region 31 together define a by-pass passage which by-passes the seating.

The part of the valve member 25 located within the valve body 23 includes an annular recess which defines, with the bore, a chamber 32 which communicates with the first end of the valve member 25 by means of flutes 33 provided in the exterior of the valve member 25. The flutes 33 and annular chamber 32 provide a flow path between the first end of the valve member 25 and the seating, the radially extending passages 30 and part of the passage 29 providing a flow path between the seating and the second end of the valve member 25.

In use, in the position illustrated in FIG. 2, the bore 20 and passage 22a of the high pressure fuel line connector 22 are both at low pressure, and the valve member 25 is biased into engagement with the seating by means of the spring 27. When injection is to commence, fuel at high pressure is supplied to the bore 20 by the pump resulting in the application of a large force to the valve member 25 acting against the action of the spring 27. The force is of a sufficiently large magnitude to move the valve member to lift the surface 26a thereof away from the seating, the movement of the valve member 25 in this direction being limited by the engagement of the second end of the valve member 25 with the end surface of the chamber 28. It will be appreciated that the movement of the valve member 25 permits fuel to flow from the bore 20 through the flutes 33 and chamber 32, past the seating to the chamber 28, and from the chamber 28 through the radially extending passages 30 and part of the passage 29 to the passage 22a of the high pressure fuel line connector 22. The available flow paths for fuel through the snubber valve are of sufficiently large area that the supply of fuel to the high pressure fuel line connector 22 is substantially unrestricted. Fuel at high pressure is thus supplied to the injector permitting the injector to open resulting in fuel being supplied to the cylinder with which the injector is associated.

In order to terminate injection, the fuel pressure within the pump is rapidly reduced. The resulting reduction in pressure within the outlet bore 20 results in a pressure imbalance across the valve member 25 and in the magnitude of the force acting on the valve member 25 against the action of the spring 27 falling, allowing the valve member 25 to move under both the action of the spring 27 and the pressure differential to bring the surface 26a into engagement with the seating. At this time, the fuel pressure within the connector 22 is greater than that within the outlet bore 20, and fuel from the connector 22 flows through the passage 29 to the outlet bore 20 through the restricted region 31. It will be appreciated that the dimensions of the restricted region 31 control the rate at which fuel is able to flow from the high pressure fuel line connector 22 through the snubber valve. The dimensions of the restricted region 31 are selected to ensure that the rate at which fuel can flow through the snubber valve is sufficiently low to reduce the risk of drawing cavities within the connector 22 and the associated fuel pipe and injector to an acceptable level.

It will be appreciated from FIG. 2 that the radially extending passages 30 and passage 29 provide a flow path for fuel which avoids fuel flowing over and around the spring 27. The reduction in flow of fuel over and around the spring 27 reduces the risk of the spring 27 being damaged due to cavitation erosion. Further, it will be appreciated from FIG. 2 that the volume of the chamber 28 is substantially smaller than the volume of the corresponding chamber of the arrangement illustrated in FIG. 1. The reduction in this volume reduces the quantity of fuel which must be pressurized for injection, thus the reduction in the volume of the chamber 28 improves the efficiency of the fuel system.

A further advantage of the arrangement illustrated in FIG. 2 over that of FIG. 1 is that the number of parts is reduced. In the arrangement of FIG. 1, the valve member and valve stop are separate integers. In the arrangement of the present invention, the separate valve stop is omitted, the movement of the valve member 25 away from its seating being limited by the engagement of the second end of the valve member with the surface defining the end of the chamber 28. The reduction in the number of parts simplifies assembly, and reduces the cost of the snubber valve.

In a modification to the illustrated embodiment, the passage 29 extends from the second end of the valve member 25 to an intermediate position and communicates with the chamber 32 through one or more radially extending passages. The region 31 may be located in either the axially extending part of the passage 29 or in the or each of the radially extending passages. It will be appreciated that, in this modification, the by-pass passage is defined, in part by the flow path defined by the flutes 33.

I claim:

1. A snubber valve comprising a valve member having a first end and a second end, said valve member extending through, and slidable within, a bore provided in a valve body, the bore in the valve body defining a seating with which a first region on the valve member is engageable, the first region being located between the first end and the second end, the valve member being biased into engagement with the seating by a spring which engages a spring abutment region on the valve member, the spring abutment region being located between the first region and the second end, the valve member and the bore in the valve body defining a flow path between the seating and the first end of the valve member, the valve member including passage means extending from the second end thereof to a part of the exterior of the valve member located between the first region and the spring abutment region, and restricted by-pass passage means providing a restricted flow path between the first and second ends of the valve member.

2. A snubber valve as claimed in claim 1, wherein said passage means is defined by part of an axially extending passage and at least one radially extending passage, the outer end of the or each radially extending passage being located between the first region and the spring abutment region.

3. A snubber valve as claimed in claim 2, wherein said by-pass passage means is defined by part of the axially extending passage which includes a region of reduced dimensions restricting the rate of fuel flow along the by-pass passage means.

4. A snubber valve as claimed in claim 3, wherein the part of the passage communicates directly with the first end of the valve member.

5. A snubber valve as claimed in claim 3, wherein the part of the passage communicates with the flow path defined between the valve member and the bore between the first end of the valve member and the seating.

* * * * *